United States Patent [19]

Jahn et al.

[11] 4,037,892

[45] July 26, 1977

[54] RADIAL ROLLER BEARING FOR TWO PARALLEL SHAFTS

[75] Inventors: Rudolf Jahn; Arpad Toth, both of Herzogenaurach, Germany

[73] Assignee: Industriewerk Schaeffler OHG, Herzogenaurach, Germany

[21] Appl. No.: 635,794

[22] Filed: Nov. 28, 1975

[30] Foreign Application Priority Data

Jan. 24, 1975 Germany .............................. 2502860

[51] Int. Cl.² ........................ F16C 23/06; F16C 35/04
[52] U.S. Cl. ................................. 308/194; 308/202; 308/207 R; 308/212
[58] Field of Search .................. 308/202, 207 R, 194, 308/212, 183, 213

[56] References Cited

U.S. PATENT DOCUMENTS

| 2,123,754 | 7/1938 | Talbot | 308/194 |
|---|---|---|---|
| 2,812,224 | 11/1957 | Richmond | 308/194 |
| 3,389,941 | 6/1968 | Haefner | 308/194 |

Primary Examiner—Richard A. Bertsch
Attorney, Agent, or Firm—Hammond & Littell

[57] ABSTRACT

A radial bearing for two parallel shafts whose direction of radial load is inclined 60° to 75° to the outside toward a line intersecting the two shaft axes comprising a pair of races with a spherical outer contour adjustably mounted in a common bearing housing, the said races being flattened at their facing points with a gap between the races whereby the axes of the races are so close together that their distance is less than the diameter of a race, the recess of the housing receiving the races having an inside width of at least the axial length of the races, one of said races being provided at the side opposite the flattened portion with two plane or slightly curved surfaces inclined to each other in the manner of a roof and running from the end faces of the race and protruding into the area of its crowned surface and the said housing being a unitary element provided in the area of one recess at one end face with an inlet groove corresponding to the cross-sectional profile of said race.

3 Claims, 2 Drawing Figures

RADIAL ROLLER BEARING FOR TWO PARALLEL SHAFTS

STATE OF THE ART

Bearings for two parallel shafts mounted in a single housing are required, for example, for the screw support on double screw extruders for plastic processing and the indicated load direction results from the two screws being coupled by spur gears whose forces from the teeth act in these directions.

Roller bearings whose races have a spherical contour on their surfaces to be mounted adjustably in a housing with a corresponding recess are known. It is also known to flatten the outer races in adjacent bearings for two parallel shafts at the points facing each other to bring the shafts to be mounted as close together as possible. Heretofore, the housing in such bearings usually consisted of two parts to permit the introduction of the races into the housing. Such two-part housings require higher manufacturing costs and involve the risk that the two housing parts will not equally support in the assembled state.

To insert a race with a spherical outer contour into a corresponding recess of a housing, it is also known to provide inlet grooves on the housing at two opposite points. In this way, it is possible to introduce the race into the housing in a position turned by 90° and to turn it subsequently into its operating position. However, the two inlet grooves reduce the supporting surface between the race and the housing to such an extent that this can frequently lead to problems regarding the load capacity.

In bearings for two parallel shafts, as in the case of the invention, an opening is already provided by the fact that the two housing recesses overlap and this opening replaces one inlet groove each for the two recesses. Since this opening provided by the overlapping extends through the entire housing, the second inlet groove can be eliminated on one housing recess because it is possible to introduce the race during the insertion in a position turned by 90° so that it is partly in the overlapping range. Then, this race can be displaced laterally until it bears on the wall of the recess in the housing provided for this purpose, after which it is brought into its operating position by 90°. The second race, however, can only be inserted into the housing recess provided for it if an additional inlet groove is provided there. This is a disadvantage because the radial load direction of the respective shaft is inclined in this direction. Thus the necessary inlet groove reduces the supporting surface between race and housing exactly in the range in which the load capacity acts.

OBJECTS OF THE INVENTION

It is an object of the invention to provide a novel bearing for economically mounting two parallel shafts wherein there is a maximum contact surface between the housing recess and the outer bearing race in the indicated direction.

This and other objects and advantages of the invention will become obvious from the following detailed description.

THE INVENTION

The novel bearing of the invention for mounting two parallel shafts whose direction of radial load is inclined 60° to 75° to the outside toward a line intersecting the two shaft axes comprises a pair of races with a spherical outer contour adjustably mounted in a common bearing housing, the said races being flattened at their facing points with a gap between the races whereby the axes of the races are so close together that their distance is less than the diameter of a race, the recess of the housing receiving the races having an inside width of at least the axial length of the races, one of said races being provided at the side opposite the flattened portion with two plane or slightly curved surfaces inclined to each other in the manner of a roof and running from the end faces of the race and protruding into the area of its crowned surface and the said housing being a unitary element provided in the area of one recess at one end face with an inlet groove corresponding to the cross-sectional profile of said race.

To keep the required inlet groove as small as possible, and thus at the same time the supporting surface between the race and the housing as large as possible, the second race is provided by the invention at the point opposite the flat portion with two plane or slightly curved surfaces inclined to form a roof, which originate from its end faces and protrude into the range of its crowned surfaces. The inlet groove in the housing is adapted to this contour, that is, due to the surfaces provided on the outer race, the inlet groove can be provided in the area of these surfaces also with straight or slightly inclined limiting surfaces so that the supporting surface between the race and the housing is increased.

In this inlet groove of the invention, an amount of ⅔ to ¾ of the total possible projection surface remains in the indicated load direction which could be available as a contact surface between the housing and the outer race, while with a conventional inlet groove, the remaining contact surface would only be about ¼ of the possible total projection surface.

The inclined roof-shaped surfaces on one race are preferably designed so that a part of the spherical outer contour still remains between these surfaces, which then bears supportingly against the corresponding spherical recess of the housing. It has been found expedient to arrange the two inclined roof-shaped surfaces in a mutual angle of about 90° to 100° C.

Referring now to the drawings.

Figure 1:
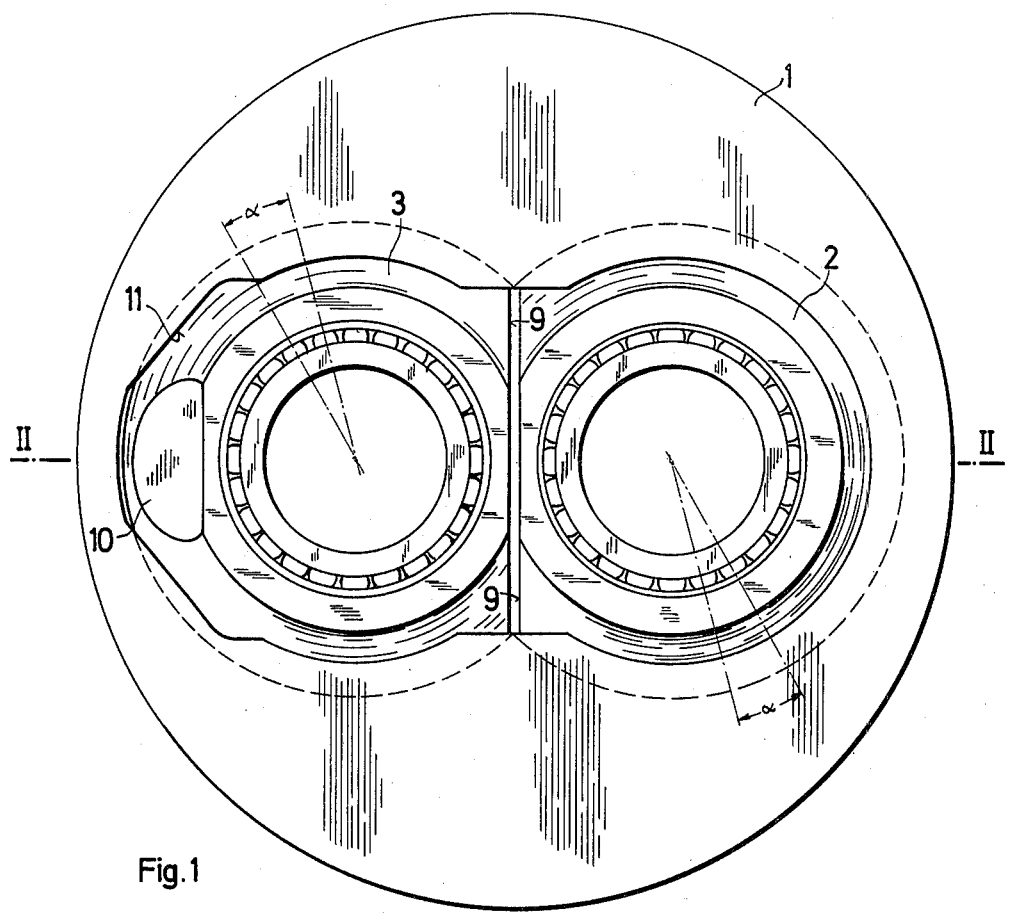
FIG. 1 is a front view of a bearing of the invention.
Figure 2:
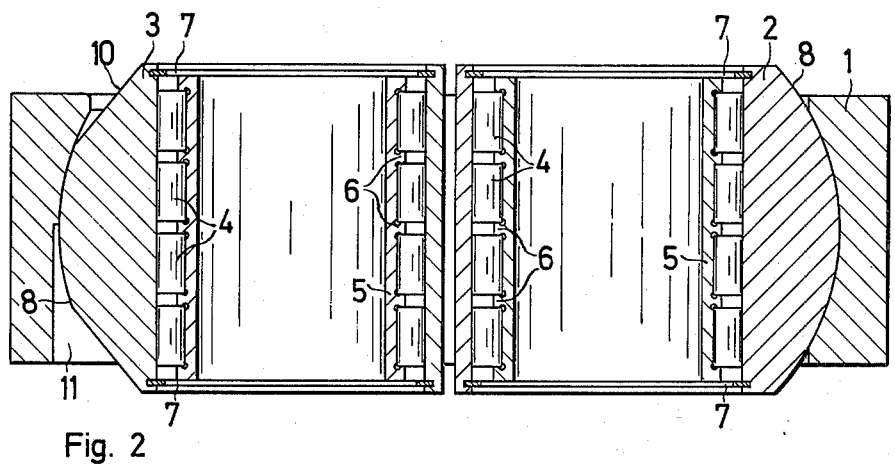
FIG. 2 is a cross-section of the said bearing taken along the line II—II of FIG. 1.

The bearing of FIGS. 1 and 2 consists of a housing 1 which receives the two races 2 and 3. The bores of races 2 and 3 are designed as raceways for cylindrical rollers 4 and the rollers 4 roll, on the other hand, on inner races 5, which effect axial parallel guidance of the rollers 4 at the same time with borders 6. Locking washers 7, are inserted next to the ends of the bore into the races 2 and 3 which prevent axial sliding of the set of rollers. Races 2 and 3 have a spherical outer contour 8 which cooperates with a corresponding contour of housing 1 and at the points facing each other, the races 2 and 3 are each provided with a flattened portion 9 between which remains a gap, which ensures the unhindered universal adjustability of races 2 and 3.

Race 3 is provided, at the point opposite the flattened portion 9, with two surfaces 10 inclined toward each other in the manner of a roof and housing 1 has in the area of race 3 an inlet groove 11 which corresponds to the contour of the longitudinal section of race 3 which is thus designed corresponding to the plane surfaces 10. At this point, it should be pointed out that the plane surfaces 10 perform their function even if understandably they are not completely plane but slightly curved, for example, for manufacturing reasons. In FIG. 1, the regions, α, in which the radial forces of the two shafts to be supported act are showing in broken lines.

The assembly of the roller bearing can be effected by race 2 being first turned by 90° into the respective opening, but displaced by a certain amount to the left toward the opening for race 2, and then being displaced to the right. After touching the recess of housing 1, it is finally turned by 90° into the position represented in FIG. 1. Subsequently, race 3 can likewise be turned by 90° into the housing recess provided for this purpose, but a displacement in the direction of race 2 is not necessary, which would not be possible anyway because race 2 has already been inserted since race 3 can be inserted through inlet groove 11. After race 3 has been inserted, it is likewise turned by 90° and assumes then the position represented in FIGS. 1 and 2.

Various modifications of the bearing construction may be made without departing from the spirit or scope thereof and it should be understood that the invention is intended to be limited only as defined in the appended claims.

We claim:

1. A radial bearing for two parallel shafts whose direction of radial load is inclined 60° to 75° to the outside toward a line intersecting the two shaft axes comprising a pair of races with a spherical outer contour adjustably mounted in a common bearing housing, the said races being flattened at their facing points with a gap between the races whereby the axes of the races are so close together that their distance is less than the diameter of a race, the recess of the housing receiving the races having an inside width of at least the axial length of the races, one of said races being provided at the side opposite the flattened portion with two plane or slightly curved surfaces inclined to each other and running from the end faces of the race and protruding into the area of its crowned surface and the said housing being a unitary element provided in the area of one recess at one end face with an inlet groove corresponding to the cross-sectional profile of said race.

2. A bearing of claim 1 wherein a portion of the crowned surface remains between the two inclined surfaces.

3. The bearing of claim 1 wherein the two inclined surfaces are at an angle of 90° to 100° to each other.

* * * * *